April 13, 1954
K. J. BUSSE
2,674,826
ARTICLE HOLDING MEANS
Filed Dec. 22, 1949
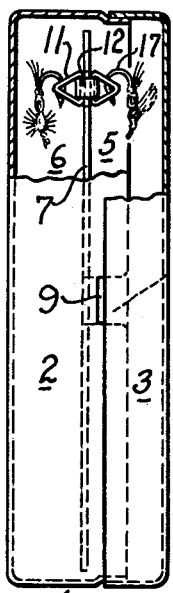
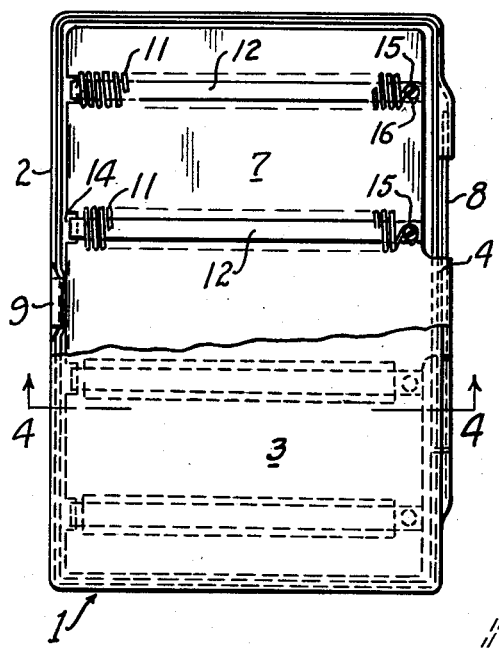
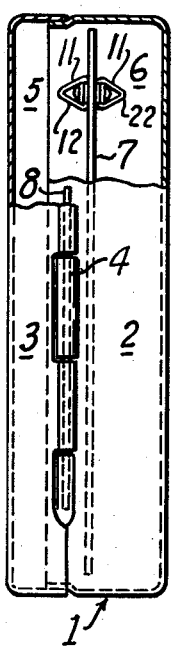
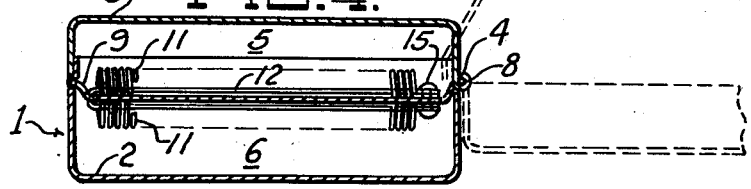
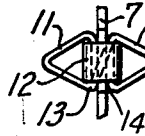
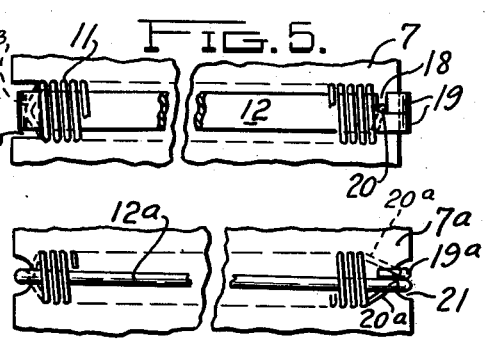
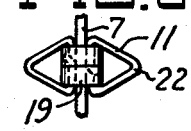
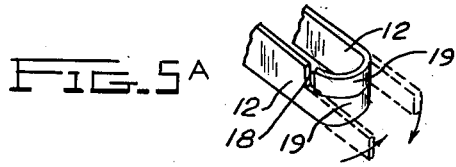
INVENTOR.
Karl J. Busse
BY Owen D. Owen
ATTORNEYS Patented Apr. 13, 1954

2,674,826

UNITED STATES PATENT OFFICE 2,674,826

ARTICLE HOLDING MEANS

Karl J. Busse, Tiffin, Ohio

Application December 22, 1949, Serial No. 134,567

6 Claims. (Cl. 43—57.5)

This invention relates primarily to holders for fly hooks used in fishing, and includes in its present embodiment a box or container for the holders.

The primary object of the invention is the provision of means of simple, efficient and novel construction for holding a plurality of fishing flies with their hooks in protected position whereby to enhance the practicability and commercial value thereof.

A further object of the invention is the provision of improved means for attaching or mounting on one or both sides of a thin, stiff sheet-like member a coiled spring for holding a fishing fly or other article.

Further objects and advantages of the invention will be apparent from the following detailed description, and from the accompanying drawings illustrating several embodiments thereof, in which Fig. 1 is a top plan view of the article holding means, with a part of the cover broken away; Figs. 2 and 3 are rear and front edge views thereof, respectively, with parts broken away; Fig. 4 is a section on the line 4—4 in Fig. 1, with the parts shown in open position in dotted lines; Fig. 5 is an enlarged fragmentary section of the coil-holding means showing a modified form of clamp therefor; Fig. 5A is an enlarged perspective detail of the right end portion of coil holder in Fig. 5 with the unfolded positions of the spur ends shown in dotted lines; Fig. 6 is a right end fragmentary view of the form shown in Fig. 5; Fig. 7 is a left end fragmentary view of the form shown in Fig. 5; Fig. 8 is an enlarged fragmentary detail of a coil and its holding means showing a modified form of holding means; Fig. 9 is a right end fragmentary view of the form shown in Fig. 8, and Fig. 10 is a left end fragmentary view of the form shown in Fig. 8.

Referring to the drawings, 1 designates a box or container comprising, in the present instance, a body 2 and a cover 3 having side wall portions which telescopically fit one over the other at their free edges with such edges hinged together at one side, as shown at 4. The box is divided into upper and lower compartments 5 and 6 by a cardlike plate or partition 7 of sheet metal or other suitable stiff material, and this partition is hinged at its rear edge preferably near the center on a pivot pin 8 on which the sections 2 and 3 of the box are hinged. The partition is provided at its front free edge near its center with a tongue 9 that seats in a notch 10 in the front edge portion of the body section 2 (Fig. 3) to support such edge of the partition. When the box sections are closed, the front free edge of the top section bears downwardly against the tongue 9 and cooperates with the hinge of the partition to hold it stationary within the box. When the box sections are opened, the partition may be raised to expose its under side and to render access to the lower compartment 6. Raising of the partition is facilitated by engaging the outer exposed end of the tongue with a thumb or finger.

On each side of the partition 7 are mounted one or more lengths of coiled wire 11 between the coils of which the hooks or other articles may be inserted and quite firmly held. These coils are preferably arranged in pairs with the coil lengths transversely opposed, or in parallel relation, to each other and separated by the partition member 7. The coils are attached to the member 7 in said opposed relation by a holder 12 of U or hairpin form which is of a length to straddle the partition member and extend approximately from one edge to another thereof. The legs of the holder 12 are spaced apart from each other to straddle the partition member and provide a space between the partition member and each leg, which space is substantially equal to the diameter of the wire forming the spring coils.

The legs of the holder 12 are inserted lengthwise through the separate coil members of a pair, and such coils may be entirely separate or may be connected at one end by an integral wire cross-connection 13 extending from an end of one coil to the adjacent end of the companion coil and around the adjacent edge of the partition member as seen in Fig. 7. When the coils of a pair and the hairpin holder 12 have been thus assembled, the formed unit is placed in straddling relation over the partition or carrying member 7 from one edge thereof, in the present instance from its free outer edge towards its hinge edge, with a coil section or length 11 at each side of the member 7, each coil section being held closely thereto at its under side by the clamping action of the holder member leg, as shown. The loop of the holder 12 and the cross-connection 13 of the two coil sections preferably engage in a registering recess or notch 14 in the holder edge so that the loop does not extend beyond the associated edge of the member 7.

The free ends of the holder legs are firmly attached to the carrying plate or partition member 7 adjacent to its inner or hinge edge by a rivet, weld or other suitable means 15. The free wire ends 16 of the two spring coils may also be clamped between the free ends of the respective holder legs and the rivet head, as shown in Fig. 1. Each coil 11 is placed under sufficient tension between a rivet 15 and the opposite edge of the plate to cause a slight separation of its convolutions to facilitate insertion of a hook or other article 17 between an adjoining pair of convolutions, as indicated. If the opposed coils are entirely separate, both ends of each coil may be attached to the member 7 in a similar manner to that shown at 15, 16.

In Figs. 5 and 6, instead of attaching the ends of the holder 12 to the plate 7, as indicated at 15, the free ends of the legs of the holder 12 in Fig. 5 are each cut away at one side thereof as shown at 18 so that a prolonged notch or cut-away portion extending to the end of the leg is provided on each leg, with such notches or cut-away portions at opposite side edges of the two laterally spaced legs as shown more clearly in Fig. 5a. This provides each leg end with a narrow spur-like member 19 that laps the inner side edge of the corresponding member 19 of the other leg in the space or notch provided in such other leg. The spur-like members 19 thus formed are lapped around the plate edge, and the end of each member 19 serves to clamp the free end of a coil against the opposing bottom of the notch 18 of the other leg, as shown at 20 in Fig. 5.

In Figs. 8, 9 and 10, the hairpin shaped coil holder 12ª is of wire instead of flat stock form and the ends of its legs are bent in opposite directions around the edge of the carrying or partition plate 7ª in side lapping relation, as shown at 19ª in said figures. The ends 20ª of the coil wires may be bent around or hooked over the plate edge inside of the holder leg ends 19ª, as shown. With this form, the plate edge is preferably provided with a notch 21 for receiving the bent-over ends 19ª of the holder and the bent-over ends 20ª of the coils.

In practice, it is preferable to have the wire coils 11 triangular in cross-section, as shown in Figs. 1 to 7, instead of circular as in Figs. 8, 9 and 10. With the triangular form, the base of the triangle of each convolution or coil section is clamped flat to the plate or partition member 7 by the engaging leg of the holder 12, thus preventing any transverse rocking of a coil relative to the plate. The two remaining legs of each triangular section of the coil extend outwardly in converging relation to an apex 22 which aligns lengthwise of the coil with the apices of the other sections. This provides the coil sections with narrow hook-engaging portions at their outer side surfaces so that small fly hooks or the like may be engaged therewith with less liability of injury to the delicate points and barbs thereof than if the hook-engaging portions are broad or rounded, as in the case of a circular coil.

While the hook-holding means (comprising the carrying plate 7, one or more U-shaped article-holding members 12 attached thereto, and one or more spring coils 11 on one or both sides of the plate) may be mounted in and form part of a fisherman's fly-holding box, it may also be used separately from a box, as for instance in connection with a display or storage mount for fish hooks or other articles.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An article of the class described, including a stiff card-like member having a notch in one edge thereof, a connected coiled spring at each of opposite sides of said member and connected at its ends to the member and adapted to hold articles between its convolutions, and a U-shaped element mounted in straddling relation on said member and having its legs extending from the notch in said stiff card-like member lengthwise through said spring coils at respective opposite sides of the member for clamping each coil of the spring to one side of the member.

2. An article of the class described, including a stiff card-like member, a coiled spring at one side of said member adapted to hold articles between its convolutions, a U-shaped element mounted in straddling relation on said member and having a leg extending lengthwise through the spring for clamping it to the member, and means attaching the ends of said element to said member and serving to hold the coil-engaging leg portion of the element in coil-clamping relation to the member, said means comprising end portions of the element legs having a bend around an adjacent edge of said member.

3. An article of the class described, including a stiff card-like member, a coiled spring at one side of said member adapted to hold articles between its convolutions, and a U-shaped element mounted in straddling relation on said member and having a leg extending lengthwise through the spring coil for holding it to the member, said U-shaped element comprising a wire bent in hairpin form.

4. An article of the class described, comprising a stiff card-like member, a coiled spring at each of opposite sides of said member with an integral extension extending around one edge of the member, a U-shaped element mounted in straddling relation on said member and having its legs extending lengthwise through said spring coils at respective opposite sides of the member for holding each spring at one side to the member, and means attaching the free ends of said element legs to the member and serving to anchor the free ends of the coiled springs to said member and holding the coils under longitudinal tension with their convolutions slightly spaced to facilitate engagement of an article therebetween.

5. An article of the class described, including a stiff card-like member having a notch in one lateral edge thereof, a coiled spring at each of opposite sides of said member adapted to hold articles between its convolutions, and a U-shaped element mounted in straddling relation on said member and having its legs extending from the notch in the stiff card-like member, said legs extending lengthwise through said spring coils at respective opposite sides of said member for clamping each coil of said coiled springs to one side of said member, the coil springs at opposite sides of said member being integrally connected through said notch in said stiff card-like member, and a rivet near the opposite edge of said card-like member holding the free ends of the coiled springs and the two legs of the U-shaped member in fixed relation to the stiff card-like member.

6. An article of the class described, including a stiff card-like member having a notch in one lateral edge thereof, a coiled spring at each of opposite sides of said member adapted to hold articles between its convolutions, and a U-shaped element mounted in straddling relation on said member and having its legs extending from the notch in the stiff card-like member, said legs extending lengthwise through said spring coils at respective opposite sides of said member for clamping each coil of said coiled springs to one side of said member, the coil springs at opposite sides of said member being integrally connected through said notch in said stiff card-like member, and means for holding the free ends of the coiled springs and the two legs of the U-shaped member in fixed relation to the stiff card-like member.

References Cited in the file of this patent

UNITED STATES PATENTS

| Number | Name | Date |
|---|---|---|
| D. 25,926 | Elliston | Aug. 11, 1896 |
| D. 52,216 | Haupt | July 23, 1918 |
| 258,393 | Endicott | May 23, 1882 |
| 333,384 | Bray | Dec. 29, 1885 |
| 360,272 | Blish | Mar. 29, 1887 |
| 392,959 | Levison | Nov. 13, 1888 |
| 642,277 | Adair | Jan. 30, 1900 |
| 1,577,566 | Cryder | Mar. 23, 1926 |
| 2,238,532 | Nothe | Apr. 15, 1941 |
| 2,270,757 | Liska | Jan. 20, 1942 |
| 2,397,291 | Robertson | Mar. 26, 1946 |